(12) United States Patent
Shih et al.

(10) Patent No.: US 7,088,999 B2
(45) Date of Patent: Aug. 8, 2006

(54) PERSONAL COMMUNICATION DEVICE WITH TRANSMITTED RF POWER STRENGTH INDICATOR

(75) Inventors: Did-Min Shih, Milpitas, CA (US); Chun-Chieh Chen, Taipei (TW); Bing-Ming Ho, Taipei (TW)

(73) Assignee: Via Technologies, Inc., Taipei (TW)

( * ) Notice: Subject to any disclaimer, the term of this patent is extended or adjusted under 35 U.S.C. 154(b) by 75 days.

(21) Appl. No.: 10/726,510

(22) Filed: Dec. 4, 2003

(65) Prior Publication Data

US 2004/0121795 A1    Jun. 24, 2004

Related U.S. Application Data

(63) Continuation-in-part of application No. 10/223,246, filed on Aug. 20, 2002.

(51) Int. Cl.
*H04Q 7/20* (2006.01)
(52) U.S. Cl. ............... 455/423; 455/522; 455/115.4
(58) Field of Classification Search ........ 455/423–425, 455/522–523, 67.11, 67.14, 67.16, 67.7, 115.1–115.4, 455/226.1–226.4
See application file for complete search history.

(56) References Cited

U.S. PATENT DOCUMENTS

| | | | | |
|---|---|---|---|---|
| 5,396,255 | A * | 3/1995 | Durkota et al. | 342/360 |
| 6,940,261 | B1 * | 9/2005 | Umminger | 323/282 |
| 2002/0123319 | A1 * | 9/2002 | Peterzell | 455/296 |
| 2005/0042995 | A1 * | 2/2005 | Chien | 455/226.1 |

* cited by examiner

*Primary Examiner*—Duc Nguyen
(74) *Attorney, Agent, or Firm*—Rabin & Berdo, P.C.

(57) ABSTRACT

A radio communication system for communication between a first mobile system and a second mobile system. Each mobile system has a transceiver for receiving and emitting radio signal. The second mobile system comprises a received signal strength detecting device, a power controller and an indicating device. The received signal strength detecting device detects a received signal strength of the transceiver in the second mobile system. The power controller outputs a transmitted power strength status and controls transmitted power of the transceiver according to the received signal strength. The indicating device receives the transmitted power strength status and indicates a transmitted RF power strength status of the transceiver in the second mobile.

7 Claims, 6 Drawing Sheets

PERSONAL COMMUNICATION DEVICE WITH TRANSMITTED RF POWER STRENGTH INDICATOR

CROSS-REFERENCE TO RELATED APPLICATION

This application is a continuation-in-part of prior application Ser. No. 10/223,246, filed Aug. 20, 2002.

BACKGROUND OF THE INVENTION

1. Field of the Invention

The present invention relates generally to a radio communication system, and more particularly, to a PCD (Personal Communication Device) and a method capable of indicating the transmitted RF power strength level of a radio communication terminal by outputting the power strength level of a transmitter of the radio communication terminal to an indicating device.

2. Description of the Related Art

AMPS, PHS, NADC, GSM, DCS, PCS, IS-95, CDMA, WCDMA, DECT, WLAN (802.11), DECT, CT0, CT1, . . . etc. are well known standards for wireless network and PCDs(personal communication devices). Personal communication devices include cellular phones, cordless phones, PDAs, walkie-talkies, smart phones and others. All personal communication devices mentioned above are wireless communication devices(or radio communication devices). Communication links among PCDs are established through receiving and transmitted radio-frequency signal. The frequency range of these radio frequency covers from VHF to microwave frequency. In order to extend the communication range, PCDs can transmit RF signal up to two Watts.

A personal communication device such as a cellular phone can

A personal communication device such as a cellular phone can be seen generally as depicted in FIG. 1, it consists of a RF(Radio Frequency) receiver Section 14, a RF Transmitter 18, a Frequency Synthesizer 146 186, a Digital/Controller Section 15, a Battery (not shown) and a I/O Section(not shown) etc,.

One example of the PCD as shown in FIG. 1 is a cellular phone handset which complied with the standards above. The handset 1 includes an antenna 11, a LPF(lowpass filter) 12 a receiver(RX) 14, a LPF 16, a transmitter (TX) 18 and a digital/controller 15, wherein the receiver(RX) 14 includes a LNA(low noise amplifier) 142 a mixer 144 and a frequency synthesizer 146. similarly, the transmitter(TX) 18 includes an power amplifier 182, a mixer 124 and a synthesizer 186 an modulator 188.

When a cellular phone handset is used, it is a very common practice for its user to have the handset very close to user's head in order to talk and to listen. The handset radiates RF (Radio Frequency) signal into air to establish communication link to a base station. But, the transmitted RF signal is not only radiated to air but also penetrates into the user's head. Some scientific studies have shown that long-term exposure under the RF signal radiation could damage human tissue. One IEEE paper proposed by M. D. Taurisano etc., having a title of "Measurements of Thermal Effects on a Human Head exposed to 900 MHz" and presented on IEEE MTT Symposium 2000, Boston., presents results of experiments concerning thermal effects due to electromagnetic exposure from handheld mobile communication equipments.

Today, personal communication devices such as cellular phone handsets, cordless phone etc. provide users some information such as RSSI (received signal strength indication) (for example, U.S. Pat. No. 6,356,745 disclose the RSSI), battery low signal and battery charge status etc., but none of them provides TSSI(transmitted signal strength indication) (or called transmitted power indication) to the users for warning the high transmitted power state about their handset.

Also the cellular phone's TSS (transmitted signal strength) is not a constant, how much RF power the cellular phone handset could transmit is subject to the specific regulations and base station instruction. It means the base station will tell the handset how much RF power handset could transmit.

Base station's instruction depends on the communication environmental conditions such as distance, surrounding building and terrain etc. between the cellular phone and the base station. By now, the cellular phone user has no idea how the TSS (transmitted signal strength) of his cellular phone is.

Because scientific studies show that long-term exposure to RF signal can damage human tissues. Therefore there is a need in the prior art to have PCDs that can inform users how much the TSS(transmitted signal strength) is. Thus the PCD users can make some action to reduce the damage to their tissues from such TSS information.

SUMMARY OF THE INVENTION

It is an objective of the present invention to the transmitted RF signal power status, user-programmable warning signal in a form of sound, vibration or voice, and user-programmable when PCD gives warning signal for the PCDs' users. With such information, PCD user can adjust PCD position or change communication location to reduce PCD's radiated RF power or shorten the talk time to reduce the exposure time to RF radiation.

On the other words, the PCD of the present invention provides a TSSI (transmitted RF power strength indication) and a warning system for the PCDs' user. With such information, PCD user can adjust PCD position or change communication location to reduce PCD's radiated RF power or shorten the talk time to reduce the exposure time to RF radiation.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

First Embodiment

Figure 1:
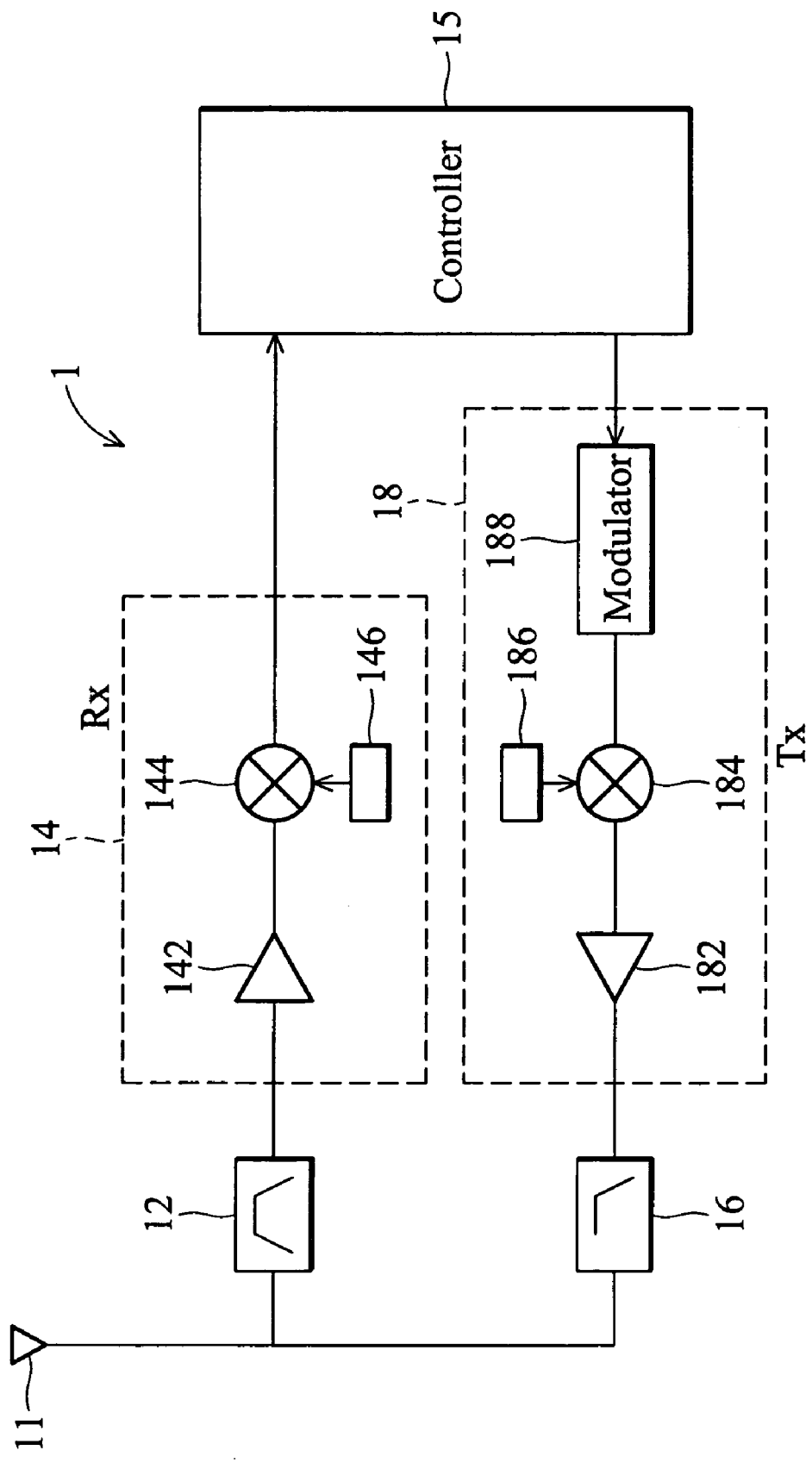
FIG. 1 is a block diagram of the PCD in the prior art.
Figure 2:
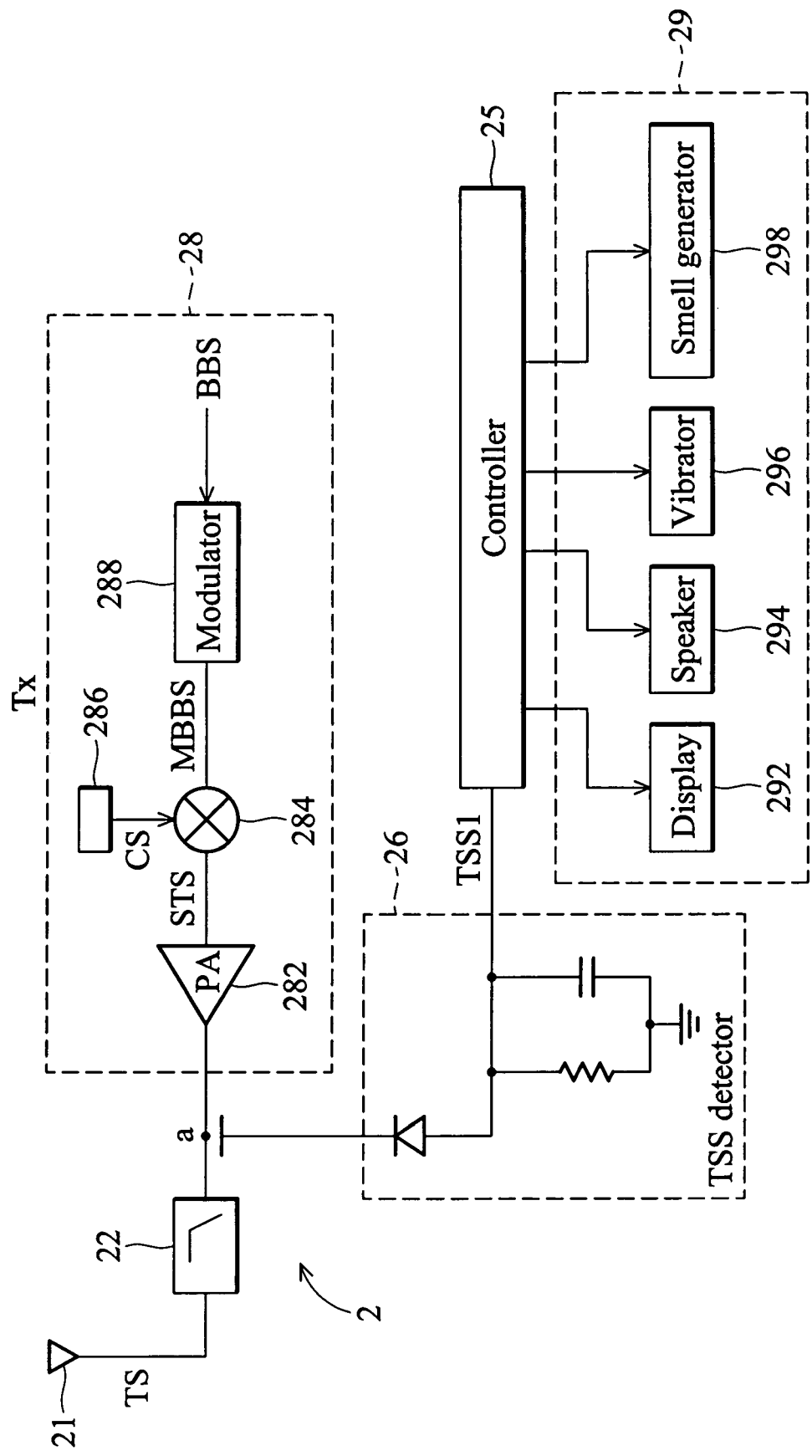
FIG. 2 is a block diagram of the first embodiment of the PCD with a transmitted RF power strength indicating circuit in the present invention.

FIG. 2 is a block diagram of the first embodiment of the PCD with a transmitted RF power strength indicating circuit in the present invention. Transmitter 28 can be seen generally as depicted in FIG. 2, it included a modulator 288, a power amplifier 282 and a transmitted RF power detector 26. The transmitted baseband signal BBS is modulated at modulation section 288, and the output signal of modulation section MBBS is further processed then connected to the power amplifier 282 or connected to the power amplifier 282 directly. The power amplifier 282, as named, amplifies the power of the output signal. The amplified output signal is then filtered by a filter 22 and fed to the antenna 21 for signal radiation. The transmitted RF power detector (or called transmitted signal strength detector) detects TSS (transmitted signal strength) or the power of the amplified output signal.

In other words, the PCD 2 of the present invention mainly comprises a RF transmitter(TX) 28 a TSS detector 26 and a Digital/controller 25 and an indicating device 29 and a Battery(not shown)etc., wherein the transmitter(TX) 28 includes a PA (power amplifier) 282, a mixer 284, a modulator 288 and a frequency synthesizer (or called a local oscillator) 286.

When a base band signal (BBS) is going to be transmitted, first the base band signal BBS will be transmitted to the modulator 288 to generate a modulated BBS signal MBBS. The mixer 284 receives the modulated BBS signal MBBS and the carrier signal CS from the frequency synthesizer 286, implements signal multiplication of them, and generated a semi-transmission signal STS. The semi-transmission signal STS is further amplified by the power amplifier 282 and filtered by a low pass filter 22 to become a transmission signal TS. Finally, the transmission signal TS is transmitted or radiated by the antenna 21.

In the present invention, the TSS detector 26 is coupled to the point a disposed between low pass filter 22 and the power amplifier 282. When a transmission signal TS is transmitted by the antenna 21, the TSS detector 26 will generate a TSS level signal, representing the transmitted RF power from the power amplifier, to transmit to the controller 25. Finally, this TSS level signal is converted by the controller to become TSS level information, which is sent to an indicator (or called an indicating device) 29 for indicating the transmitted RF power strength of the PCD 2.

Figure 4:
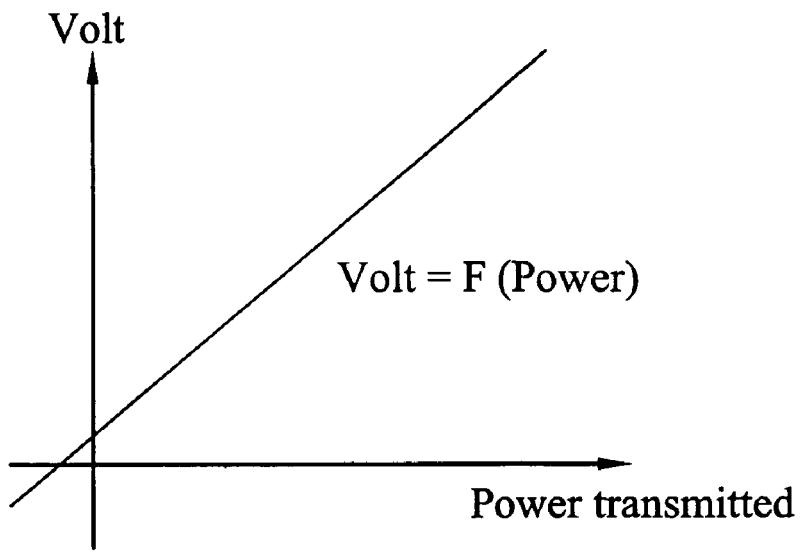
FIG. 4 is a graph of relationship between TSS level and the transmitted signal RF power strength.

Originally what the TSS detector 26 detects is the transmitted voltage at the node a and the output TSS1 represents it. As know in the art, there must be a function relationship between TSS1 and the transmitted RF power of the transmitter. FIG. 4 shows a example of the function relationship. Such a function relationship can be built in a PCD as a look-up-table or an equation to convert the TSS1 value into the transmitted RF power or the TSS level information. The transmitted RF power may be expressed in mWatt scale or in dBm scale according to the following equation.

$$\text{Power}_{in\_dBm} = 10 * \log [\text{Power}_{in\_mWatt}/1 \text{ mWatt}]$$

Second Embodiment

Figure 3:
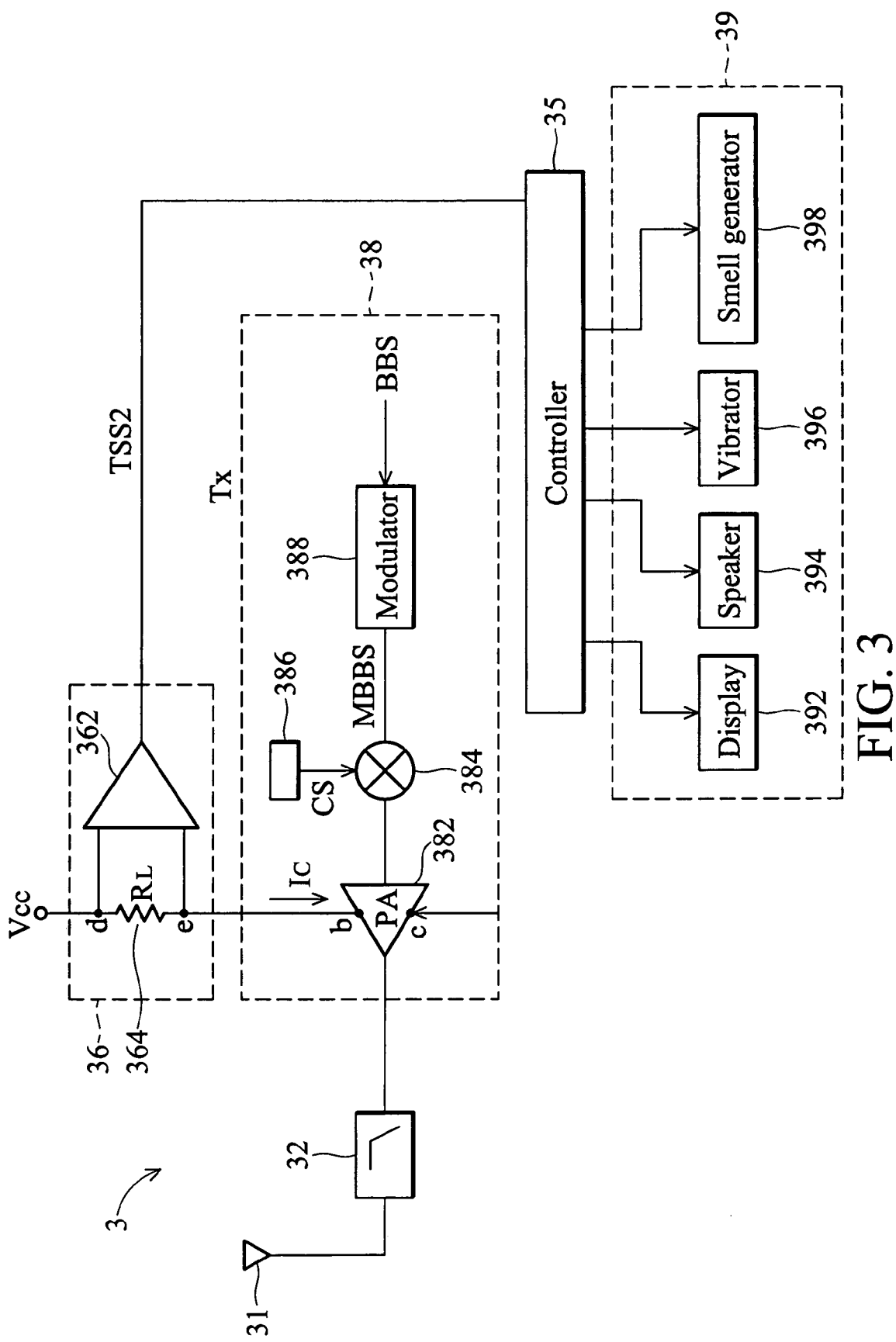
FIG. 3 is a block diagram of the second embodiment of the PCD with a transmitted RF power strength indicator in the present invention.

FIG. 3 is a block diagram of the second embodiment of the PCD with a transmitted RF power strength indicating circuit in the present invention. The second embodiment is similar to the first embodiment except the TSS detector 36. The transmitted signal strength TSS can be determined by sensing PA's (Power amplifier 382) dc current consumption as shown in FIG.3.

The transmitted RF power detector 36 (or called transmitted signal strength detector) is used to detect the TSS (transmitted signal strength) level. Once the TSS is detected, the detection result TSS2 will be sent to the controller 35, the controller will display corresponding TSS status in LCD or LED and deliver a user-programmable warning signal in a form of smell, sound, vibration, light or voice etc. to the PCD user. It is also user-programmable when a PCD generates the warning signal.

With the TSS status information, the PCD user can adjust their PCD position or change communication location to reduce the tissue absorption of PCD's radiated RF power or shorten talk-time to reduce the exposure of the RF radiation.

The TSS detector 36 is coupled between a power source Vcc and a power amplifier 382 to detect the DC offset (or current) powering the power amplifier 382 of the transmitter 38, and outputs the detecting result to the controller 35. Resistor RL of the TSS detector 36 creates voltage difference between nodes d and e and such voltage difference is in proportion to the DC current Ic. Operational amplifier 362 in the TSS detector 36 amplifies the voltage difference and outputs it as TSS2 to controller 35.

Because there is a somehow relationship between the current $I_c$ and the transmitted power consumption, thus the transmitted signal power strength can be detect by the TSS detector 36 and displayed in an indicating device 39.

Third Embodiment

Figure 5:
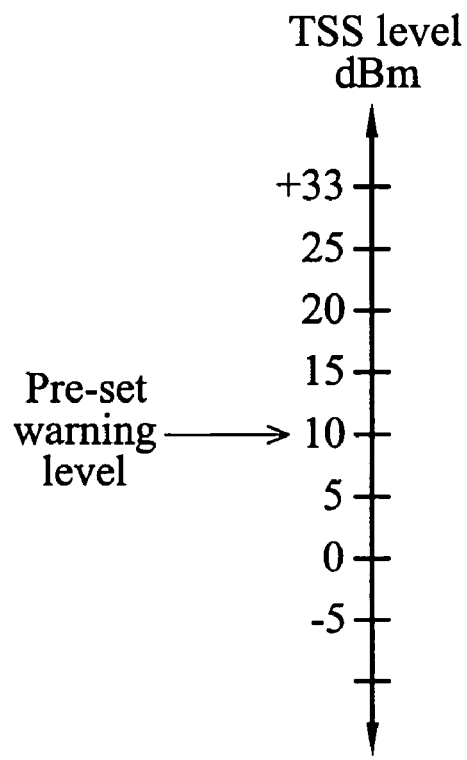
FIG. 5 is a graph of setting a warning level for the transmitted RF power strength of the third embodiment in the present invention.
Figure 6:
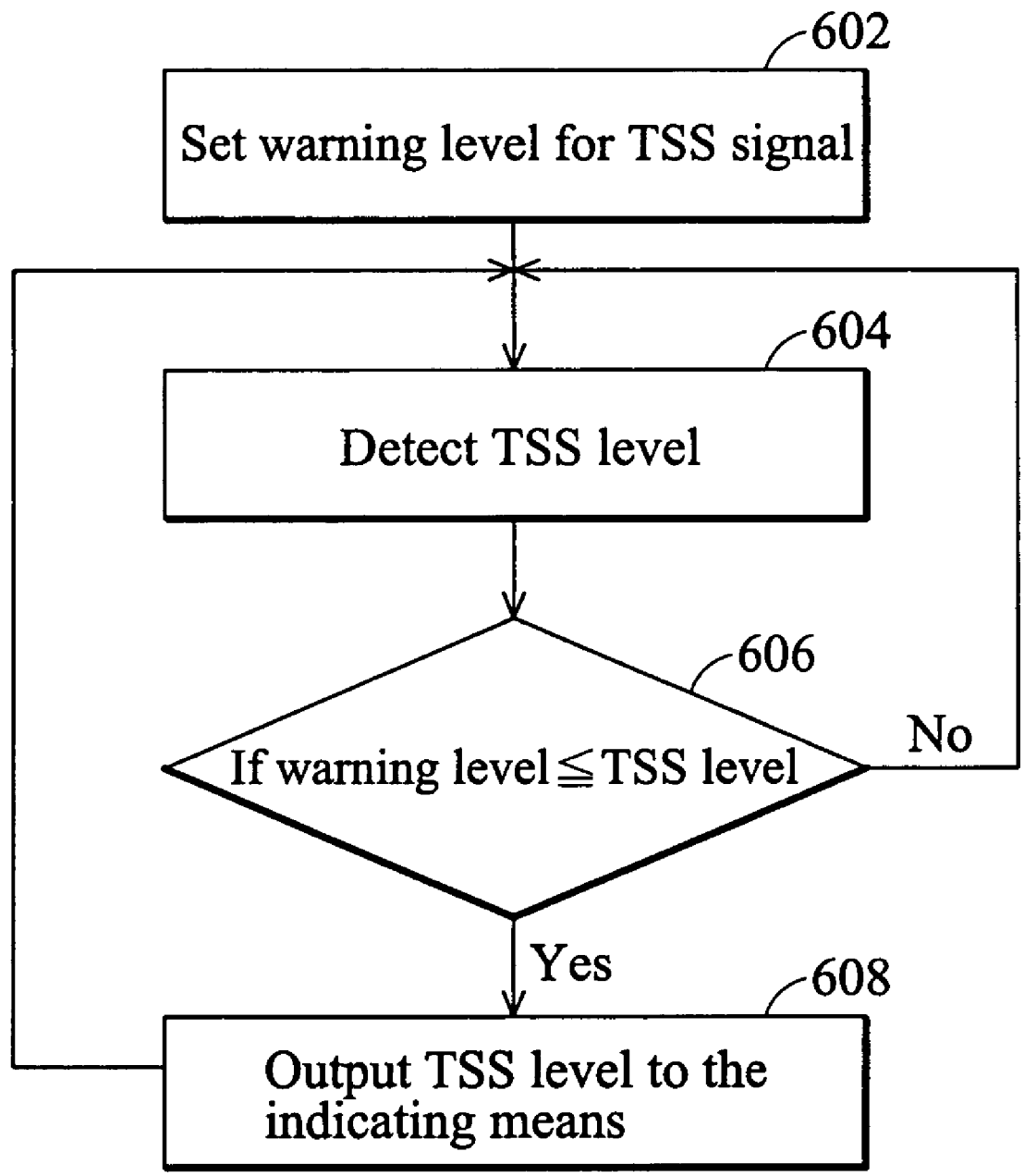
FIG. 6 is a flow chart for indicating a transmitted RF power strength of the third embodiment in the present invention.

FIG. 6 is a flow chart for indicating a transmitted RF power strength according to the present invention. The present invention also provides a method to indicating a transmitted RF power strength status of a transmitter for warning a PCD's user of high RF radiation. The method includes the following steps Pre-set a warning level for the transmitted RF power strength as shown in step 602, for example, in dBm scale. Generally, a GSM handset emits RF radiation with a power range from −5 to 33 dBm. FIG. 5 is a graph of setting a warning level for the transmitted RF power strength in the present invention. In this example, we set 10 dBm as the pre-set warning level.

Detect the TSS level as shown in step 604. The detection method and apparatus can be found from the previous two embodiments.

If the TSS level is greater than the warning level, then execute the step (d), else execute step (b) as shown in step 606. Output the TSS level to the indicating device as shown in step 608.

Fourth Embodiment

Figure 7A:
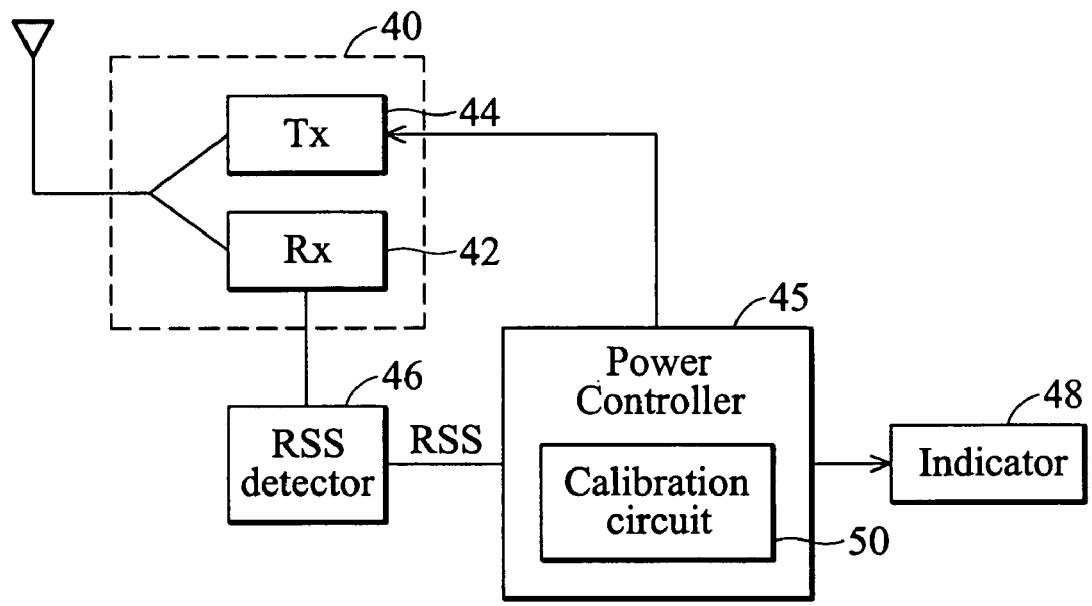
FIG. 7(a) is a block diagram of the fourth embodiment of the PCD with a transmitted RF power strength indicator by calibrating RSSI signal in the present invention.

FIG. 7(a) is a block diagram of the fourth embodiment of the PCD with a transmitted RF power strength indicator by calibrating RSSI signal in the present invention. The PCD 4 mainly comprises a RF transceiver 40, a RSS (received signal strength) detector 46, a power controller 45, an indicating device 49 and other peripheries, such as a Battery or a housing (not shown) etc. The transceiver 40, as known in the art, includes a transmitter 44 and a receiver 42.

The RSS detector 46 generates RSS signal, representing the power of RF signal received by the receiver 42. This RSS signal may be digital or analog, depending on the design.

The power controller 45 controls the transmitted power of the transmitter 44, basically depending on the RSS signal. For example, it is well known in the art that the higher the RSS, the closer the base station and the less the transmitted power needed, theoretically. In other words, there is negative dependence between the transmitted power and the received power. The power controller 45 achieves this reverse correlation, to lessen the transmitted power when RSS becomes higher.

In order to alert the user of the PCD about the strength of the transmitted power, the power controller 45 also plays a role as a reporter, bringing the transmitted power strength of the transmitter 44 to the indicator 48. As mentioned before, the indicator 48 is not limited to be a display means (such as an LCD or a LED). The indicator 48 can be any means that an user can feel about. For example, a vibrator, a speaker or a smell generator can be a candidate of the indicator 48.

The power controller 45 in FIG. 7*a* also has a calibration circuit 50, which optionally modifies the transmitted power by the user during operation or by the manufacture in the foundry. Even though this concept of negative dependence is known, the actual negative dependence for a single PCD varies from PCD to PCD because of performance variation of the devices used in a PCD. Therefore, PCD manufacture can calibrate this negative dependence by setting the calibration circuit 50. An user of a PCD may also be allowed to have personal negative dependence depending on his/her own favorite, if the calibration circuit 50 is accessible an settable to the user.

Figure 7B:
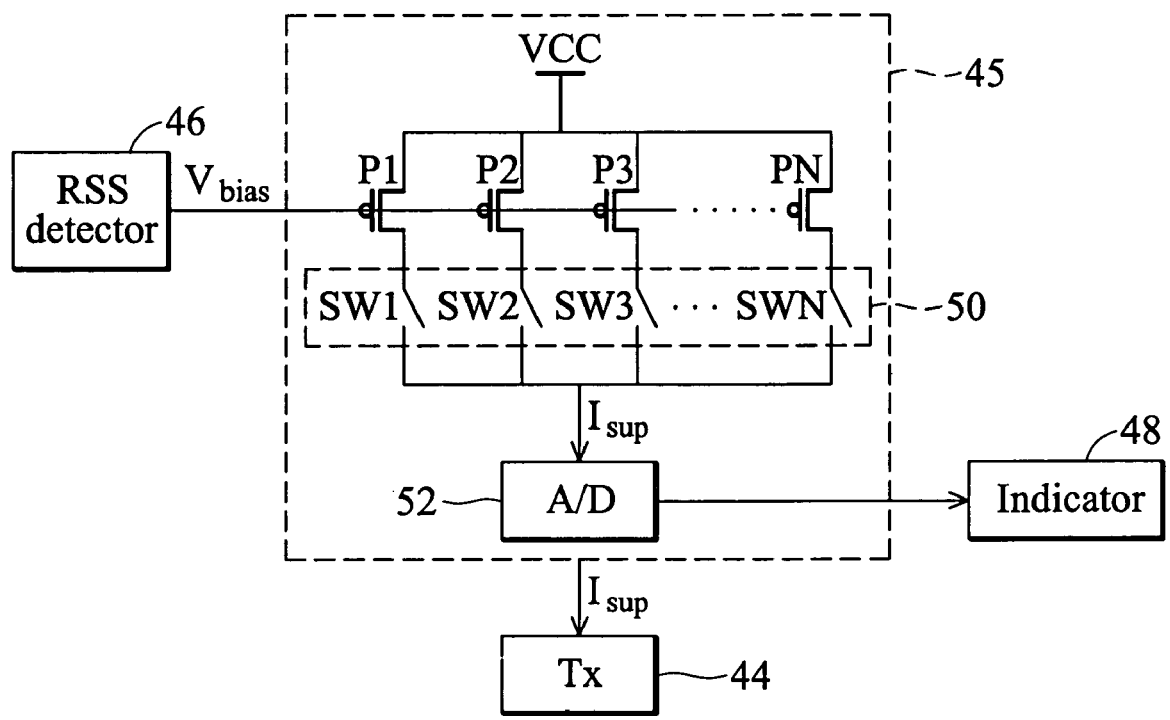
FIG. 7(b) exemplarily shows details of the power controller associating with the transmitter, the indicator and the detector in FIG. 7(a).

FIG. 7(*b*) exemplarily shows details of the power controller 45 associating with the transmitter 44, the indicator 48 and the RSS detector 46. There are PMOS transistors (P1–PN) arranged in parallel in the power controller 45, each or in together acting as a V-I converter. The sources of the PMOS transistors P1–PN are connected together to a high voltage power source VCC while their gates are connected to receive $V_{bias}$, a voltage representing the RSS signal from the RSS detector 46. At saturation condition, the current through the channel of a PMOS transistor is solely controlled by the voltage applied on the gate of the PMOS: hence the name V-I converter. The calibration circuit 50 is embodied as switches SW1–SWN respectively connected in series with PMOS transistors P1–PN. By programming to selectively turn on or off switches SW1–SWN, the total amount of current supplying to the transmitter 44 can be decided. For example, set P1 averagely has $2^0$ unit of current driving ability, P2 $2^1$ units, P3 $2^2$ units, P4 $2^3$ units, etc. When 10 units of current driving ability are needed for a PCD to operation, SW2 and SW4 should be turned on while other switches are turned off, thereby supplying 10 units of current driving ability to the transmitter 44. If, accidentally, due to device performance variation, all the PMOS transistors in the power controller 45 of a specific PCD have current driving ability 20% less than common ones. That means, in that specific PCD, P1 has only $2^0*80\%$ unit of current driving ability, P2 $2^1*80\%$ units, etc. To match said requirement of 10 units of current driving ability, a PCD manufacture or a PCD user can program to turn on SW3 and SW4 and turn off others thereby totally supplying 9.6 (=12*0.8) units of current driving ability.

In FIG. 7(*b*), the power controller 45 includes an analog-to-digital converter 52, through which $I_{sup}$ also passes. The A/D converter 52 detects that current, $I_{sup}$, generates a corresponding digital signal as a transmitted power strength status, and forwards the digital signal to the indicator 48. The A/D converter 52 can be omitted if another kind of power controller 45 is used. Since the power controller 45 responses for controlling the transmitted power of the transmitter 44, it can directly generate and output information relevant to the transmitted power. The A/D converter 52 in FIG. 7(*b*) is only an example to play a role of transmitter power information provider.

In another perspective, this invention provides a method for indicating a transmitted signal power level of a PCD. First of all, the received signal of the PCD is detected and a corresponding received signal strength is generated. A conversion from the received signal strength to supply current is then executed and this supply current powers the transmitter of the PCD. Such a conversion can be implemented by a V-I converter or any similar means known in the art. Optional calibration can be performed by PCD manufacture or the end user to modify the dependency between the received signal strength and the supply current. The transmitted power strength of the transmitter is also determined. This determination can be implemented by detecting the amount of the supply current. The transmitted power strength is then fed to an indicating device to alert the user of the PCD whether he/she is exposed under the danger of RF radiation.

In comparison with a PCD in the prior art, from which an user knows nothing about its transmitted power, the PCD of the present invention provides a way to let an user know the danger of RF exposure by indicating its RF radiation power.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A radio communication system for communication between a first mobile system and a second mobile system, each of the first and the second mobile systems having a transceiver for receiving and emitting radio signals, the second mobile system comprising:
    a received signal strength detecting device for detecting a received signal strength of the transceiver in the second mobile system, wherein the received signal strength is represented as voltage;
    a power controller for outputting a transmitted power strength status comprising:
    a V-I converter which is a transistor array comprising P-type MOS transistors, wherein the gates of the P-type MOS transistors are controlled by the received signal strength, the V-I converter generates a supply current to power a transmitter of the transceiver in the second mobile system corresponding to the received signal strength to control a transmitted power of the transceiver in the second mobile system;
    a transmitted power calibration device with switches, wherein each switch is connected in series with a corresponding P-type MOS transistor in the V-I converter to decide whether current is allowed to flow through the corresponding P-type MOS transistor; and
    an indicating device for receiving the transmitted power strength status and indicating a transmitted RF power strength status of the transceiver in the second mobile system.

2. The radio communication system as claimed in claim 1, wherein the power controller comprises a transmitted power calibration device connected in series with the V-I converter to calibrate the supply current for controlling the transmitted power of the second mobile.

3. The radio communication system as claimed in claim 1, wherein the power controller further has a current measurer to measure the supply current and to correspondingly generate the transmitted power strength status.

4. The radio communication system as claimed in claim 3, wherein the current measurer is an analog to digital converter.

5. A method for indicating a transmitted signal power level of a Personal Communication Device (PCD), the method comprising the following steps:
   detecting a received signal strength of a received signal of the PCD;
   converting the received signal strength into a supply current to control a transmitter of the PCD;
   calibrating the supply current to modify the transmitted power of the transmitter, wherein the supply current is determined by a plurality of switches, selectively turned-on or turned-off;
   determining a transmitted power strength of the transmitter; and
   indicating the transmitted power strength via an indicating device in the PCD, whereby an user of the PCD is alerted to RF radiation of the PCD.

6. The method as claimed in claim 5, wherein the received signal strength is represented as voltage and the step of converting the received signal strength into the supply current is performing a V-I conversion.

7. The method as claimed in claim 5, wherein the step of determining the transmitted power strength of the transmitter is performed by detecting the supply current.

* * * * *